United States Patent Office 3,028,913
Patented Apr. 10, 1962

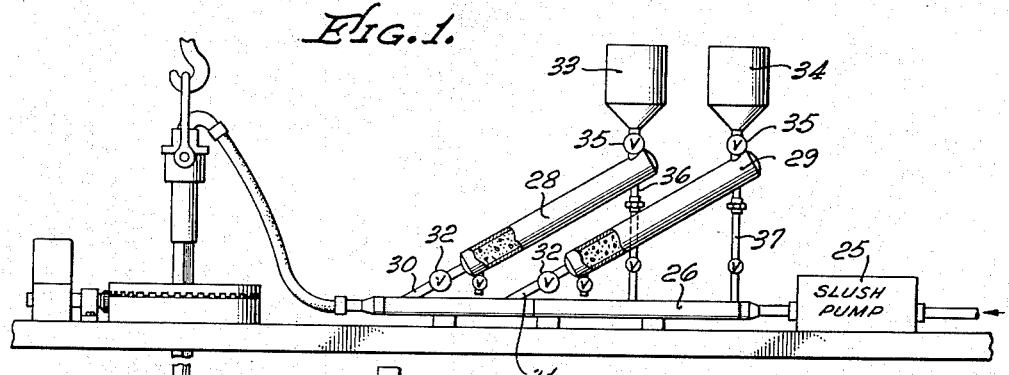
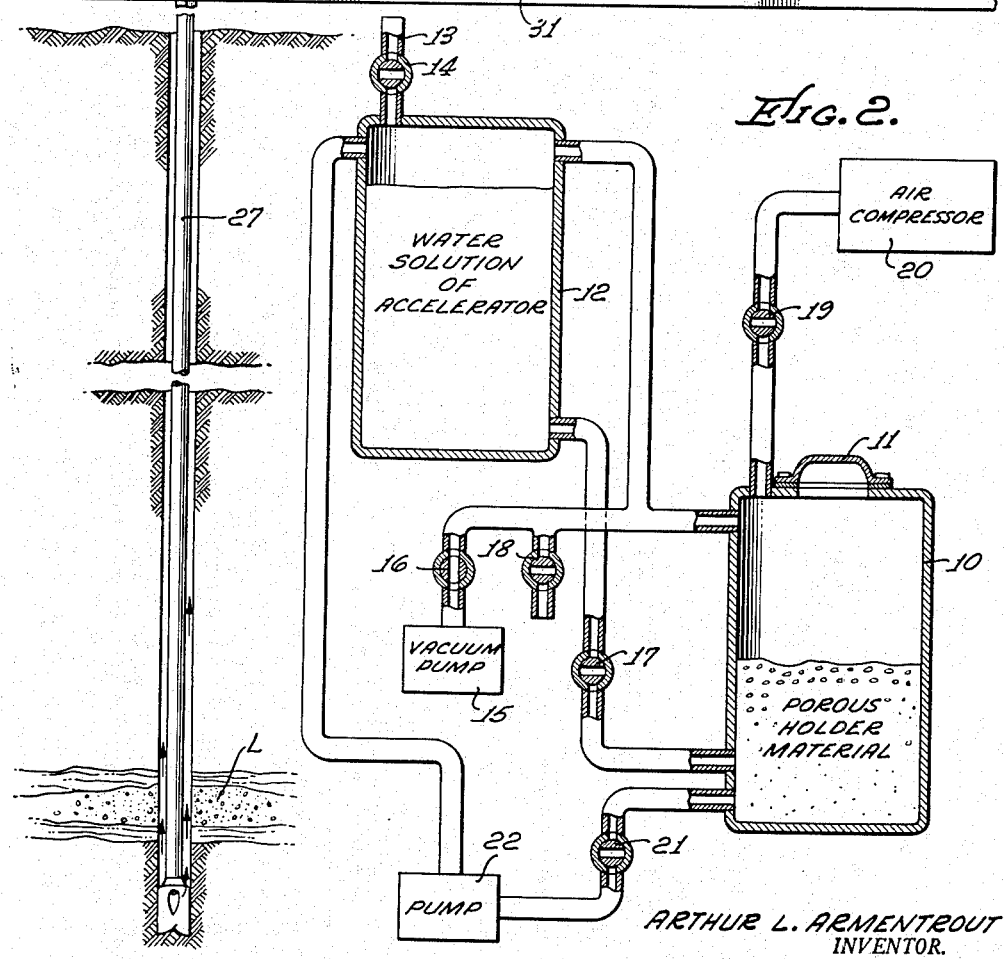

3,028,913
RECOVERING LOST CIRCULATION IN WELLS
Arthur L. Armentrout, 455 E. Ocean Blvd.,
Long Beach 2, Calif.
Filed Feb. 4, 1957, Ser. No. 638,100
11 Claims. (Cl. 166—29)

This invention relates to a method and to a composition for recovering lost circulation in drilling wells.

Explanatory of the present invention, in the course of drilling wells the well bore may traverse a formation through which circulation fluid can become lost. That is, the formation may have therein cracks, crevices, fractures and fissures or may be of a highly porous nature so that the circulation fluid escapes therethrough. Consequently, if the well is being drilled by rotary well drilling apparatus the circulation fluid that is used to cool the bit and to flush out the cuttings and carry them to the surface following which the circulation fluid is recirculated or pumped down through the drill stem, is instead lost and escapes through the cracks, crevices, and fissures in these leaky formations.

In an effort to plug the cracks, crevices, and fissures in the leaky formations many proposals have heretofore been made wherein various materials have been pumped down through the drill stem and carried by the circulation fluid to the leaky formation. These materials have frequently been of a character intended to form a type of mat intended to dam up or plug up the leaky formations and thus retard or prevent the escape of circulation fluid and cause it to return to the surface.

In some cases methods and compositions heretofore used have proven successful. However, under varying circumstances these methods have proven to be failures resulting in a complete loss of the well. There is a very large variety of different circumstances that may be encountered in a well in which circulation fluid may become lost. In some instances water sands are traversed wherein the water is fresh water. In other instances water sands may be traversed wherein the water is salt water. The depth of the well frequently is indicative of pressure and temperature conditions that may exist at or near the leaky formation. That is, in extremely deep wells temperatures encountered may be well in excess of 300° F. and pressure conditions are correspondingly quite high.

A primary object of the present invention is to provide an improved method and composition which is highly flexible and versatile in that it will form a highly effective seal or plug in the leaky formation under the wide variety of conditions or circumstances that may be encountered. Essentially, the process consists of introducing into the well a hydratable material in a pumpable or flowable condition along with a delayed-action accelerator which, when it is released in substantial quantity, will cause the material to gel or stiffen into a relatively thick, semi-solid, plastic mass. In this manner, the hydratable material can be carried by the circulation fluid to the leaky formation through which the circulation fluid has become lost and the delayed-action accelerator will be carried along with the material into the cracks, crevices, or fissures of the leaky formation. When sufficient material and its accelerator have been carried into the leaky formation conditions in the well are allowed to become static or as near static as possible, and in due time the accelerator is released in a quantity sufficient to cause the hydratable material to gel into the semi-solid plastic mass which effectively plugs and seals the leaky formation against the escape of circulation fluid when drilling operations are resumed. In this manner, as the hydratable material is kept in a pumpable or flowable condition as it is introduced into the well it can be carried to the location or locations where circulation fluid is being lost, and as the action of the accelerator is delayed, it will also be carried with the material into the same locations. The passage of time causes the accelerator to be released and cause the hydratable material to gel into the semi-solid plastic sealing mass. As the gelled material is of a semi-solid nature whatever gelled material remains in the bore hole can be easily removed and flushed out when drilling operations are resumed.

I have found that hydratable materials suitable for use in accordance with the present invention can only be introduced into water in relatively small or limited quantities if the aqueous mixture is to remain in a pumpable or flowable condition. It is desirable, of course, to have available in the cracks, crevices, and fissures of the leaky formation as high a concentration of the hydratable material as possible so that when the material is caused to gel by the release of the accelerator, that an adequate supply of the hydratable material will be present to form the desirable stiff, semi-solid plastic sealing mass. By introducing into the water used to form the aqueous mixture of the hydratable material certain inhibiters, it is possible to add to the water greater amounts of the hydratable material and still have the aqueous mixture pumpable or flowable over the time required for the hydratable material to reach the leaky formation. In this manner, by making an aqueous mixture of inhibiter, hydratable material and delayed-action or slowly-released accelerator, a very high concentration of hydratable material can be used and the aqueous mixture will still be pumpable or flowable down through the drill stem and to the location where circulation is being lost. Then, with the passage of time the accelerator on being released, neutralizes or overcomes the effect of the inhibiter and causes the hydratable material to gel in situ in the cracks and crevices of the leaky formation.

While in some instances the method embodying the present invention can be performed by supplying certain additives to materials available at the well site, in other instances all of the materials must be supplied.

It is therefore another object of the invention to provide a composition which may be transported to the well site in a dry and ready-mixed condition in sacks or other suitable containers, and which, on being mixed with water, will form the aqueous mixture that can be pumped or introduced into the well and caused to flow to the leaky formation and through it and there set up or gel into the semi-solid plastic sealing mass.

Another object of the present invention is to provide a novel and inexpensive delayed-action accelerator which will delay the release of the accelerator in substantial quantity until the accelerator has had an opportunity to be carried down through the drill stem and carried to the leaky formation, thus postponing a gelling of the hydratable material until the hydratable material and the delayed-action accelerator have reached the leaky formation.

With the foregoing and other objects in view, which will be made manifest in the following detailed description and specifically pointed out in the appended claims, reference is had to the accompanying drawings for an illustrative embodiment of the invention, wherein:

FIGURE 1 is a diagrammatic view illustrating apparatus by which the method embodying the present invention can be performed; and FIG. 2 is a diagrammatic view of apparatus by which the delayed-action accelerator can be produced.

The base of gelable and hydratable materials which I have found suitable for carrying out my method and for preparing my composition comprises dehydrated expandable-type bentonite clay, Rosamond Lake clay and sepiolite-type clay. The expandable bentonite-type clay is of the well-known commercial grade. The natural clay from Rosamond Dry Lake in California, is also well known. As substitutes for the Rosamond Lake clay the natural clay obtained from Rogers Dry Lake in California, or the Cronese Dry Lake in California both function satisfactorily. The sepiolite-type clay which I have found suitable is obtainable from a natural deposit in the vicinity of Death Valley Junction, California. Its composition is approximately as follows:

| | Percent |
|---|---|
| Silica | 35.8 |
| Magnesia | 19.5 |
| Alumina | 3.5 |
| Lime | 10.0 |
| Iron | 1.5 |
| Water | 27.5 |

Balance, minor impurities.

There are certain limitations under which these base materials can be introduced into water and still have an aqueous mixture of such a character that it is still pumpable or flowable without resorting to the use of inhibitors. Thus, in the case of bentonite the approximate maximum amount of bentonite that can be introduced into a barrel of water and still have the mixture pumpable and flowable is 28 lbs. In the case of Rosamond Dry Lake clay the approximate maximum amount that can be introduced into a barrel of water and still have the mixture pumpable or flowable is 450 lbs. In the case of the sepiolite-type clay, the maximum amount is approximately 50 lbs. per barrel of water.

I have found that by the use of certain inhibitors that the amounts of the base or gelable material that can be added to water and still have the aqueous mixture pumpable or flowable can be materially increased. Thus, in the case of bentonite if an inhibitor is added to the water either prior to the introduction of the bentonite, or at the same time, the amount of bentonite that can be added to a barrel of water and still have the aqueous mixture pumpable or flowable can be increased from 28 lbs. to as high as 150 lbs. Inhibitors useful in bringing about such an increase in the case of bentonite include sodium tripolyphosphate, sodium acid pyrophosphate, and chlorides, such as sodium chloride, calcium chloride, magnesium chloride, and zinc chloride.

Similarly, in the case of natural Rosamond Lake clay, the amount of clay that can be added to a barrel of water and still retain its pumpable or flowable characteristics can be increased from 450 lbs. to 650 lbs. by the use of such inhibitors as sodium tripolyphosphate or sodium acid pyrophosphate.

Likewise in the case of the sepiolite-type clay, the amount of clay that can be added to a barrel of water and still retain the pumpable or flowable characteristics can be increased from 50 lbs. to as high as 200 lbs. by the use of such inhibitors as sodium tripolyphosphate and sodium acid pyrophosphate.

By the use of inhibitors the amount of base or gelable material that can be added to the water can be materially increased so that if it is desired that the material which enters the leaky formation be in a highly concentrated or dense condition the inhibitor makes this possible without detracting from the pumpable or flowability of the aqueous mixture while it is being carried into the cracks and crevices in the leaky formation.

Whether or not an inhibitor is used, I introduce into the well along with the aqueous mixture of the base or gelable material a delayed-action accelerator. That is, an accelerator which is slowly released and diffused throughout the aqueous mixture. The slow release or diffusion of the accelerator is designed to postpone its gelling effect on the base or gelable material until the sealing composition has had an opportunity to be carried to and into the leaky formation. When this has been accomplished further passage of time allows a slow but steady release of the accelerator and its diffusion through the aqueous mixture, causing the hydratable gelable material to gel and set up into the form of a thick, semisolid plastic mass that is not easily disturbed. In the case of bentonite the accelerators employed are preferably sodium hydroxide, potassium hydroxide, silicate of soda, calcium hydroxide, or magnesium hydroxide. These same accelerators are suitable for use with the Rosamond Lake clay. Accelerators suitable for use with the sepiolite-type clay include sodium chloride, calcium chloride, magnesium chloride, zinc chloride, sodium hydroxide, potassium hydroxide, and calcium hydroxide.

Whatever the accelerator may be that is required it is preferably introduced into the aqueous mixture in a slowly releasable condition. Thus, it may be introduced in the form of small compact pellets which, due to their having been highly compressed or extruded under high pressure, only slowly dissolve or diffuse in the aqueous mixture. In the preferred form, however, I introduce the accelerator by filling the pores of an inert porous material. Suitable for this purpose is a bloated or expanded shale that has been burned in a rotary kiln or by sintering on grates. A material that I have used with success is a shale obtained from a range of hills near Ventura, California, which has been calcined and which is sold under the trade name of "Rocklite." This expanded shale has numerous small pores which may be filled with my accelerator. In lieu of the expanded shale other inert materials, such as for example crushed common brick, may be employed or crushed pumice stone. Any material may be employed as a holder for the accelerator that can be formed, cut, or crushed to the desired size and which has the necessary porosity to accept and hold the accelerator.

The particle size of the accelerator holder may vary considerably from as small as $\frac{1}{32}''$ particle to as high as $1''$ particles. If the material is to be introduced into the well by having it pass through the slush pumps and into the drill stem the particle size should not exceed $\frac{3}{16}''$. On the other hand, if the accelerator holder is introduced into the well by an apparatus as illustrated in FIG. 1, the particle size of the accelerator holder may be any size up to approximately $1''$ in diameter.

I have illustrated diagrammatically in FIG. 2 an apparatus by which the porous inert holder material such as expanded shale, crushed brick or crushed pumice stone may be impregnated with the accelerator so that the accelerator will be held in a slowly releasable condition. In this figure the tank 10 may be largely filled with the inert porous holder such as the expanded shale, crushed brick or crushed pumice stone, the filling being accomplished by the removal of a manhole cover 11. In association with the tank 10 there is a tank 12 which is largely filled with a water solution of the accelerator. This solution is introduced into tank 12 through a filling nipple 13 on opening valve 14. It is desirable that the water solution of the accelerator be as near saturated as possible. However, in actual practice I find that dissolving approximately 140 pounds of the accelerator per barrel of water is adequate in the case of the accelerators sodium hydroxide, potassium hydroxide, sodium chloride, calcium chloride, magnesium chloride and zinc chloride. Where the accelerator used is silicate of soda a 40% aqueous solution of silicate of soda is used. When the porous material and the accelerator solution are in place in their respective tanks 10 and 12, a vacuum pump 15 is started and the valve 16 is opened which pumps as much air as possible from the interiors of tanks 10 and 12, the intention being to extract all air from the pores of the porous holder material.

When this has been accomplished valve 17 is opened and the water solution of the accelerator selected is allowed to run from tank 12 into tank 10 so that the granules of the porous holder material are completely immersed therein. Valve 16 is then closed and valve 18 is opened to atmosphere allowing atmospheric pressure to enter the tanks 10 and 12. The atmospheric pressure that is allowed to enter tank 10 tends to drive the accelerator solution into the pores of the porous holder. Valve 18 may then be closed and valve 19 opened allowing air pressure to enter the tank 10 in a highly compressed condition. This air pressure may be in the order of 100 to 200 pounds per square inch and may be received from any suitable source such as from an air compressor 20. This high pressure serves to further drive the water solution of the accelerator into the pores of the porous holder.

Valve 19 can then be closed and after valve 18 has again been opened valve 21 can be opened allowing pump 22 to pump the excess of solution that has not been absorbed by the porous holder material from tank 10 back to tank 12. The porous holder material is then removed from tank 10 and allowed to drain and is preferably transferred to an oven in which it is heated to a temperature of approximately 180° F. for about three hours during which most of the excess water is driven off. The temperature can then be raised to approximately 300° F. for about three hours or until the excess moisture is practically all removed. This procedure results in a deposit in the minute microscopic pores of the porous holder of approximately six to eight pounds of the selected accelerator for each 100 pounds of the porous holder processed during the first treatment. The dried porous holder or expanded shale containing some of the accelerator can then be returned to tank 10 and the process repeated until practically all of the pores or interstices in the holder material are filled with the selected accelerator. In three successive treatments of the same holder material as much as 15 pounds of the selected accelerator can be introduced into the pores of 100 pounds of the porous holder material which will give an adequate supply of accelerator.

In the case of expanded shale or Rocklite, crushed brick or crushed pumice stone, the capacity or volume of the microscopic pores, cracks and interstices in the material compared to the gross volume of the material is approximately as follows:

| Particle size: | Percentage |
| --- | --- |
| 1/32" Rocklite | 30 |
| 1/16" Rocklite | 30 |
| 1/8" Rocklite | 29 |
| 3/16" Rocklite | 28 |
| 1/4" Rocklite | 27 |
| 3/8" Rocklite | 24 |
| 1/2" Rocklite | 22 |
| 5/8" Rocklite | 20 |
| 3/4" Rocklite | 18 |
| 7/8" Rocklite | 17 |
| 1" Rocklite | 15 |
| Crushed brick, all sizes | 20 |
| Crushed pumice stone, all sizes | 40 |

In all instances the accelerator that is exposed at the outer ends of the pores in the porous material holder is subject to dissolving as soon as the porous material and its contained accelerator are introduced into water. However, the accelerator at the outer end of each pore must first be dissolved away before inner accelerator is exposed to the water and is consequently subjected to its dissolving action. In this way the dissolving of the accelerator from the porous material requires a substantial length of time which is more than adequate to transmit the material from the surface to the leaky formation through which circulation is being lost.

In treating a well bore for lost circulation using bentonite as the gelable or setable material the following ingredients are introduced into the well through the slush pump and the accelerator holder or aggregate through an apparatus as depicted in FIG. 1. The following are typical examples:

EXAMPLE 1

| Bbls. of Water | Inhibitor Lbs. per Bbl. of Water | Sealing Material Lbs. per Bbl. | Accelerator Recommended Minimum per Bbl. of Water |
| --- | --- | --- | --- |
| 1 | 0 | Bentonite clay 28#. | Sodium hydroxide 4# or Potassium hydroxide 4# or Silicate of soda 4# or Calcium hydroxide pellets 50# or Magnesium hydroxide pellets 50#. |

EXAMPLE 2

| 1 | Sodium tripolyphosphate 2½# or Sodium acid pyrophosphate 5# or Sodium chloride 3# or Calcium chloride 1½# or Magnesium chloride 3# or Zinc chloride 1½#. | Bentonite clay 50#. | Sodium hydroxide 5# or Potassium hydroxide #5 or Silicate of soda 5# or Calcium hydroxide pellets 50# or Magnesium hydroxide pellets 50#. |

EXAMPLE 3

| 1 | Sodium chloride 6# or Calcium chloride 3# or Magnesium chloride 6# or Zinc chloride 3#. | Bentonite clay 75#. | Sodium hydroxide 6# or Potassium hydroxide 6# or Silicate of soda 6# or Calcium hydroxide pellets 50# or Magnesium hydroxide pellets 50#. |

EXAMPLE 4

| 1 | Sodium chloride 10# or Calcium chloride 5# or Magnesium chloride 10# or Zinc chloride 5#. | Bentonite clay 100#. | Sodium hydroxide 7# or Potassium hydroxide 7# or Silicate of soda 7# or Calcium hydroxide pellets 50# or Magnesium hydroxide pellets 50#. |

EXAMPLE 5

| 1 | Sodium chloride 20# or Calcium chloride 10# or Magnesium chloride 20# or Zinc chloride 10#. | Bentonite clay 125#. | Sodium hydroxide 8# or Potassium hydroxide 8# or Silicate of soda 8# or Calcium hydroxide pellets 50# or Magnesium hydroxide pellets 50#. |

EXAMPLE 6

| 1 | Sodium chloride 22# or Calcium chloride 11# or Magnesium chloride 22# or Zinc chloride 11#. | Bentonite Clay 150#. | Sodium hydroxide 9# or Potassium hydroxide 9# or Silicate of soda 9# or Calcium hydroxide pellets 50# or Magnesium hydroxide pellets 50#. |

Where the sealing material is Rosamond Lake clay or its equivalent as above explained, examples are as follows:

EXAMPLE 7

| Bbls. of Water | Inhibitor Lbs. per Bbl. of Water | Sealing Material Lbs. per Bbl. | Accelerator Recommended Minimum per Bbl. of Water |
| --- | --- | --- | --- |
| 1 | 0 | Rosamond Lake clay 450#. | Sodium hydroxide 5# or Potassium hydroxide 5# or Silicate of soda 5# or Calcium hydroxide pellets 50# or Magnesium hydroxide pellets 50#. |

EXAMPLE 8

| Bbls. of Water | Inhibitor Lbs. per Bbl. of Water | Sealing Material Lbs. per Bbl. | Accelerator Recommended Minimum per Bbl. of Water |
|---|---|---|---|
| 1 | Sodium tripolyphosphate 1# or Sodium acid pyrophosphate 2#. | Rosamond Lake clay 550#. | Sodium hydroxide 6# or Potassium hydroxide 6# or Silicate of soda 6# or Calcium hydroxide pellets 50# or Magnesium hydroxide pellets 50#. |

EXAMPLE 9

| | | | |
|---|---|---|---|
| 1 | Sodium tripolyphosphate 2# or Sodium acid pyrophosphate 4#. | Rosamond Lake clay 650#. | Sodium hydroxide 7# or Potassium hydroxide 7# or Silicate of soda 7# or Calcium hydroxide pellets 50# or Magnesium hydroxide pellets 50#. |

Where the sealing material is sepiolite-type clay, examples are as follows:

EXAMPLE 10

| Bbls. of Water | Inhibitor Lbs. per Bbl. of Water | Sealing Material Lbs. per Bbl. | Accelerator Recommended Minimum per Bbl. of Water |
|---|---|---|---|
| 1 | 0 | Sepiolite-type clay 50#. | Sodium chloride 3# or Calcium chloride 3# or Magnesium chloride 3# or Zinc chloride 3# or Sodium hydroxide 3# or Potassium hydroxide 3# or Calcium hydroxide pellets 50#. |

EXAMPLE 11

| | | | |
|---|---|---|---|
| 1 | Sodium tripolyphosphate ⅛# or Sodium acid pyrophosphate 4#. | Sepiolite-type clay 75#. | Sodium chloride 4# or Calcium chloride 4# or Magnesium chloride 4# or Zinc chloride 4# or Sodium hydroxide 4# or Potassium hydroxide 4# or Calcium hydroxide pellets 50#. |

EXAMPLE 12

| | | | |
|---|---|---|---|
| 1 | Sodium tripolyphosphate ½# or Sodium acid pyrophosphate 4#. | Sepiolite-type clay 74#. | Sodium chloride 4# or Calcium chloride 4# or Magnesium chloride 4# or Zinc chloride 4# or Sodium hydroxide 4# or Potassium hydroxide 4# or Calcium hydroxide pellets 50#. |

EXAMPLE 13

| | | | |
|---|---|---|---|
| 1 | Sodium tripolyphosphate ¾# or Sodium acid pyrophosphate 5#. | Sepiolite 100#. | Sodium chloride 5# or Calcium chloride 5# or Magnesium chloride 5# or Zinc chloride 5# or Potassium hydroxide 5# or Calcium hydroxide pellets 50#. |

EXAMPLE 14

| | | | |
|---|---|---|---|
| 1 | Sodium tripolyphosphate 3# or Sodium acid pyrophosphate 7#. | Sepiolite-type clay 150#. | Sodium chloride 6# or Calcium chloride 6# or Magnesium chloride 6# or Zinc chloride 6# or Sodium hydroxide 6# or Potassium hydroxide 6# or Calcium hydroxide pellets 50#. |

EXAMPLE 15

| Bbls. of Water | Inhibitor Lbs. per Bbl. of Water | Sealing Material Lbs. per Bbl. | Accelerator Recommended Minimum per Bbl. of Water |
|---|---|---|---|
| 1 | Sodium tripolyphosphate 4# or Sodium acid pyrophosphate 8#. | Sepiolite-type clay 175#. | Sodium chloride 7# or Calcium chloride 7# or Magnesium chloride 7# or Zinc chloride 7# or Sodium hydroxide 7# or Potassium hydroxide 7# or Calcium hydroxide pellets 50#. |

EXAMPLE 16

| | | | |
|---|---|---|---|
| 1 | Sodium tripolyphosphate 5# or Sodium acid pyrophosphate 10#. | Sepiolite-type clay 200#. | Sodium chloride 8# or Calcium chloride 8# or Magnesium chloride 8# or Zinc chloride 8# or Sodium hydroxide 8# or Potassium hydroxide 8# or Calcium hydroxide pellets 50#. |

The aqueous compositions that use only hydroxides as accelerators are suitable for use in bore holes wherein there is encountered fresh water. The aqueous compositions that use only chlorides as accelerators should be used in salt water bore holes. The aqueous compositions that use either hydroxides or chlorides as accelerators may be used in either fresh water bore holes or salt water bore holes.

It will be noted that in the foregoing examples the amount of accelerator used is stated as a recommended minimum amount in pounds per barrel of water. This minimum amount has reference to the amount of accelerator that has been introduced into and which is confined in the pores of the porous holder, that is, the amount of accelerator that is in the pores of the expanded shale, the crushed brick, or the crushed pumice stone. The amount of accelerator used can be materially in excess of the recommended minimum amount. The recommended minimum amount is approximately that amount which is required to effect a gelling or setting of the sealing material, and any excess of accelerator present does not have any detrimental effect.

When mixing the sealing compositions the inhibitor, if used, is first added to the water and thoroughly mixed and then the sealing material is added and thoroughly mixed. If desired there may be added to the mixture a few pounds of cottonseed hulls, textile fibers, asbestos fibers, expanded perlite, or other material may be added, which materials are intended to contribute toward the formation of a mat-like body in the material as it ultimately gels. If desired a few pounds of pellets disclosed in my United States Patent No. 2,634,098, or in my copending application Serial No. 441,149, filed July 2, 1954, can be added to or with the holder or aggregate containing the accelerator. The aqueous mixture can then be pumped through the pumps down the drill stem and the accelerator is finally added to the composition by being introduced for flow down the drill stem by an apparatus as illustrated in FIG. 1.

In the alternative, the composition can be introduced into the well and released near the suspected location of the leaky formation L, such as by a dump bailer.

The viscosity and shear of the aqueous compositions must be sufficiently high so that the aggregates or holders for the accelerators will not settle out. As it is desirable to deliver the entire mixture into the cracks, crevices, and fissures of the leaky formation in as near a homogeneous mass as possible, I prefer that the viscosity of the aqueous mixture be approximately 200 as measured by the Marsh funnel and have a shear of approximately ten pounds per 100 square feet initial and 15 lbs. per 100 square feet after ten minutes as determined with an A.P.I. shearometer. Viscosities of up to 400 may be used if desired. The viscosity and shear can be regulated by the ratio of water, inhibitors, and sealing material used per barrel of mix.

When the sealing material is mixed with water containing the inhibiter specified the sealing material will not hydrate or absorb any more water except extremely slowly. The inhibitors cause the sealing materials to become hydrophobic or water-repellant. Under these circumstances the clays will remain pumpable for several hours, in fact indefinitely, affording an adequate opportunity for the aqueous mixture to flow and to be carried to the leaky formation. There, as the accelerator is carried along with the sealing material and is dispersed through it the accelerator will slowly leach out or dissolve out of the holder therefor, and as the accelerator dissolves out the sealing material becomes hydrophillic or hygroscopic with the result that it absorbs water, expands, and gels into a firm plastic mass of a semi-solid character which resists being disturbed. The result is a plastic plug or seal that is formed in situ in the openings in the leaky formation.

The fact that the accelerator is impregnated in and fills the pores of the porous holder whether it be expanded shale, crushed common brick, or pumice stone, causes the accelerator to have a delayed action in that the leaching or dissolving out of the accelerator takes place quite slowly. If, for any reason, it is desirable to further delay the leaching or dissolving out of the accelerator, the accelerator holder with its impregnated accelerator may be coated with a coating. For example, a coating may be prepared consisting of 1575 milliliters of methylene chloride, 175 milliliters of denatured alcohol, and 100 grams of cellulose acetate (I prefer to use Herculese #T-H-5 cellulose acetate because of its high tensile strength). Such a coating, when its ingredients are thoroughly mixed may be sprayed onto the expanded shale, common brick, or pumice stone holders containing the impregnated accelerator and the holder can then be allowed to dry. The coating produced thereon develops microscopic cracks and holes that permits water to enter the holder extremely slowly and this further delays the release or dispersion of the accelerator under the heat and pressure conditions that may be encountered in the well.

In lieu of the foregoing coating the holder with its impregnated accelerator can be dipped in a solution composed of 1000 milliliters of mineral spirits having a boiling point of approximately 180° F., 50 grams of paraffin, and 50 grams of magnesium stearate. When the holder is dipped into this mixture and removed the excess is allowed to drain off and the holder is allowed to dry. This coating also develops microscopic cracks or holders that allows water to enter very slowly and consequently delays the leaching out or the dispersion of the accelerator under the heat and pressure conditions encountered in the well.

Where the accelerator is made up in the form of pellets for the purpose of delaying its dissolving or dispersion the pellets may be made up as follows: a 40% aqueous solution of the selected accelerator is first prepared and added to a clay, such as an expandable gel-type bentonite or the sepiolite-type clay. The amount of aqueous solution of the accelerator that is added to the clay is equal to approximately 30% by weight of the amount of clay employed. The solution and clay are thoroughly mixed and then extruded into pellets of the desired size which pellets are allowed to dry. The pellets are then baked at a temperature of around 300 F., and may or may not be spray-coated with the cellulose acetate solution above described, or dipped in the mixture of mineral spirits, paraffin, and magnesium stearate above described. When the pellets are dried they are ready for use.

Each 100 pounds of pellets will contain approximately 12 pounds of accelerator. The sepiolite-type pellets may be used in either fresh water bore holes or salt water bore holes. The bentonite pellets should only be used in fresh water bore holes.

When it is desired to introduce the calcium hydroxide or magnesium hydroxide in the form of pellets, 30% to 50% by weight of water is added to either calcium hydroxide or magnesium hydroxide and thoroughly mixed and then extruded into pellets of the desired size and allowed to dry. The pellets are further dried at approximately 300° F. They may or may not be spray-coated with the cellulose acetate solution above described or with the mixture of mineral spirits, paraffin, or magnesium stearate. The pellets retain their potency even after long periods of storage.

It is frequently desirable to add to the aqueous mixtures above described an aggregate. If the aggregate is impregnated with the accelerator then of course it does double duty. When aggregates are introduced I prefer to employ a series of screened aggregates of progressively increasing size. Thus, the aqueous mixture may be pumped down the drill stem to the approximate location of lost circulation in batches of 50 bbls. or more. Into the first batch there may be incorporated an aggregate consisting of expanded shale or the equivalent having a particle size of approximately $\frac{1}{16}''$ in diameter. In the second batch the aggregate employed may consist of expanded shale having a particle size of approximately $\frac{1}{8}''$ in diameter. The third batch may contain an aggregate of expanded shale having a particle size of $\frac{3}{16}''$ in diameter. Where the aggregate does not exceed $\frac{3}{16}''$ in diameter the aqueous mixture and aggregate can be pumped through the slush pumps of a rotary well drilling apparatus that may be at the well. Larger aggregates may be employed consisting of expanded shale having a particle size of $\frac{1}{4}''$ in diameter, $\frac{3}{8}''$ in diameter, $\frac{1}{2}''$ in diameter, $\frac{5}{8}''$ in diameter, $\frac{3}{4}''$ in diameter, $\frac{7}{8}''$ in diameter, and as large as $1''$ in diameter, and where desirable an assortment of several sizes may be combined.

Where the particle size of the aggregate is in excess of $\frac{3}{16}''$ in diameter, I may employ an apparatus such as that illustrated in FIG. 1, wherein the slush pump 25 pumps the aqueous sealing mixture through a manifold 26 into a drill stem 27. Tanks 28 and 29 are located near the manifold and have outlets 30 and 31 leading into the manifold. These outlets are controlled by valves 32. Hoppers 33 and 34 lead to the tanks 28 and 29 and are controlled by valves 35. Valved connections indicated at 36 and 37 lead from the manifold to the tops of the tanks for the purpose of equalizing pressures therein. The aggregate can be deposited in the hoppers 33 and 34 and fed therefrom into the tanks 28 and 29 on opening valves 35 and closing the valves 32 and the valves in the valved connections 36 and 37.

When the tanks have been filled with the aggregate the valves 35 may be closed and valves 32 opened allowing the aggregate to be fed from the tanks into the manifold 26 and thus carried down the drill stem with the aqueous mixture for discharge in the bore hole. One tank 28 may be employed while the other tank 29 is being filled or reloaded after which tank 29 may be employed while tank 28 is being reloaded.

The particular apparatus employed for flowing or introducing the aqueous mixture with or without aggregate down the drill stem and into the well is immaterial insofar as the present invention is concerned, and as above explained, where the aggregate is small the mixture may be introduced and passed directly through the slush pump itself.

When the mixture and the accelerator holder with or without aggregate is released in the well it is carried to the location where circulation is being lost and is allowed to become static except that the water content of the mixture is slowly dissolving or leaching out the accelerator which, as it is released, causes the sealing material to gel and set up into the semi-solid which has the accelerator holder particles and aggregate, if employed, distributed therethrough forming a relatively heavy semi-solid plug which resists movement. Any excess of material remaining in the bore hole is easily drilled up and flushed out when the drilling operations are resumed.

Under certain conditions it is desirable to transport the materials used to recover lost circulation in a premixed dry condition to the well. Where this is desirable for use in fresh water bore holes a typical mixture consists of the following by weight:

60% expandable-type bentonite
5% calcium chloride (inhibitor)
35% of ⅛″ expanded shale impregnated with accelerator (approximately 15%).

200 pounds of such a mixture may be added to approximately each barrel of water and a pumpable mixture is obtained.

For salt water bore holes a typical mixture consists of the following by weight:

68% sepiolite-type clay
2% sodium tripolyphosphate (inhibitor)
30% expanded shale impregnated with accelerator (approximately 15%).

200 pounds of the above mixture added to approximately one barrel of water produces a pumpable mixture.

The use of ⅛″ expanded shale is preferable in the above dry mixtures so that the mixtures can be mixed with regular pumps using a conventional mixing hopper or cement mixing equipment may be used at the well site. The expanded shale of these sizes will go through the slush pumps or cement pumps without fouling.

Where compressed accelerator pellets or accelerator holder or aggregate larger than ⅛″ is used then the sealing material, inhibitors and water are mixed with a conventional mixing hopper or cement mixing equipment. In that way, the aqueous sealing mixture can be picked up by pump 25 and pumped into the manifold 26 where the pellets or accelerator holder and (aggregate if used) from tanks 28 and 29 is added to the aqueous mixture and so down the drill stem. The apparatus shown in FIG. 1 is only used to add the accelerator holder, aggregate or pellets to the aqueous sealing mixture.

From the above-described construction it will be appreciated that an improved method and composition for recovering lost circulation in wells has been developed which is highly advantageous. If the well circulation fluid already contains expandable-type bentonite clay, or any clays such as the Rosamond Lake, Rogers Lake, Cronese Lake or the sepiolite-type, lost circulation can sometimes be recovered by merely introducing into the circulation fluid the delayed-action accelerator which will be carried by the circulation fluid to the leaky formation. Conditions may then be allowed to become static during which the accelerator may be released slowly and cause the bentonite to gel into the semi-solid plastic mass. Usually, however, if bentonite is present in the circulation fluid it is not in sufficient concentration to form a sufficiently stiff semi-solid and for this reason additional bentonite must normally be added preferably with inhibitors and the delayed-action accelerator. In all instances, I prefer to employ aqueous compositions containing the maximum amount of sealing material together with inhibitors and delayed-action accelerators that will still be pumpable or flowable to the location or locations where circulation is being lost.

It is not essential that the acelerator be introduced into the well at or approximately at the same time that the gelable material and its inhibitor be introduced. In some instances, the leaky formation in the well may contain an adequate concentration of the accelerator as a natural fluid. Thus, if the leaky formation contains an adequate concentration of salt water (sodium chloride) the accelerator may be regarded as already being in the leaky formation. Sodium chloride is one of the accelerators listed in Examples 10 through 15 for the sepiolite-type clay. Where this situation exists the gelable material and its inhibitor are only pumped into the well and into the leaky formation, and when conditions are allowed to become static the accelerator which is the sodium chloride already present in the formation overcomes the effect of the inhibitor and causes the sepiolite-type clay to gel into a semi-solid plastic mass.

Also, it is possible to pump a concentrated solution of the accelerator down into the bore hole and into the leaky formation in advance of pumping the sealing mixture with its inhibitor. This procedure may be adopted with any of the sealing materials referred to herein and their respective inhibitors. When the accelerator has been forced into the leaky formation and the sealing material together with its inhibitor is subsequently forced therein, the accelerator will in time overcome the effect of the inhibitor and cause the sealing material to gel or set up into a semi-solid plastic mass which will prevent the escape of circulation fluid when drilling operations are resumed.

In all instances where the accelerator is introduced into the well, its dissolving or dispersing action in water is purposely delayed or prolonged by reason of its structure. This is accomplished by having it in a form wherein its surface that is exposed is small per unit of its volume. Thus where the pores of "Rocklite," crushed brick or pumice stone are filled or impregnated with the accelerator only the surfaces at the outer ends of the pores are exposed to the dissolving action of the water. Where the accelerator is in the form of small compressed compact pellets, the exposed surface per unit of volume is small as compared with an equal volume of accelerator reduced to a powder. Likewise, when the accelerator is coated with a coating as herein described, the exposed surface to leaching through microscopic cracks in the coating is small per unit of total volume of accelerator present.

Various changes may be made in the details of construction without departing from the spirit or scope of the invention as defined by the claims.

I claim:

1. A composition for use in recovering lost circulation in wells comprising the following ingredients in approximately the following proportions by weight:

60% expandable type mentonite clay
5% metallic chloride
35% of porous inert holder impregnated with a metallic hydroxide (approximately 15%).

2. A composition for use in recovering lost circulation in wells containing salt water comprising the following ingredients in substantially the following proportions by weight:

68% sepiolite-type clay
2% sodium tripolyphosphate
30% of a porous inert granular holder impregnated with a metallic chloride (approximately 15%).

3. The method of plugging porous earth formations through which leakage is taking place which comprises positioning in such formations expandable-type bentonite clay, an inhibitor therefor selected from the group consisting of sodium tripolyphosphate, sodium acid pyrophosphate, and metallic chlorides, and an accelerator consisting of granules of porous inert material whose pores are impregnated with one of the group consisting of strong metallic hydroxides and silicate of soda, said accelerator being in sufficient quantity to overcome the effects of the inhibitor and cause the bentonite clay to swell and gel into a semi-solid plastic mass.

4. The method of recovering lost circulation in a well which includes introducing into the well and transmitting to the location where circulation is being lost, a pumpable aqueous mixture containing hydratable clay material and an inhibitor designed to render the material temporarily hydrophobic, and an accelerator designed to counteract and a sufficient quantity to counteract the effect of the inhibitor and render the clay material hydrophilic, the accelerator being in a form such that its exposed surface is small per unit of volume, transmitting these circumstances to the location where circulation is being lost, and allowing well conditions to become static whereby no great volume of the accelerator will be dissolved or dispersed during transit but with the passage of time, while conditions are static, sufficient accelerator will be dissolved or dispersed to overcome the effects of the inhibitor and allow the clay material to absorb water, swell and gel in situ.

5. The method of recovering lost circulation in a well which includes introducing into the well and transmitting to the location where circulation is being lost, a pumpable aqueous mixture containing a hydratable clay material selected from the group consisting of dehydrated expandable type bentonite clay, Rosamond Lake clay and sepiolite type clay, and inhibitor therefor for rendering the same temporarily hydrophobic, selected from the group consisting of sodium tripolyphosphate, sodium acid pyrophosphate and metallic chlorides, and an accelerator in sufficient quantity to overcome the effect of the inhibitor and render the clay material hydrophilic, selected from the group consisting of strong hydroxides, silicate of soda and metallic chlorides, the accelerator being in a form such that its exposed surface is small per unit of its volume, and allowing well conditions to become static whereby during transit to the location where circulation is being lost no substantial amount of accelerator will be dissolved or dispersed, but with the passage of time, while well conditions are static, sufficient accelerator will be dissolved or dispersed to overcome the effects of the inhibitor, thus allowing the clay material to become hydrophilic and swell and gel in situ.

6. The method of recovering lost circulation in a well which comprises introducing into the well and transmitting to the location where circulation is being lost dehydrated expandable bentonite clay, an inhibitor therefor for temporarily rendering the clay hydrophobic, selected from the group consisting of sodium tripolyphosphate, sodium acid pyrophosphate and metallic chlorides, and an accelerator in sufficient quantity to overcome the effects of the inhibitor and render the clay hydrophilic, selected from the group consisting of strong hydroxides and silicate of soda, the accelerator being in a form wherein its exposed surface is small per unit of its volume, and allowing conditions in the well to become static whereby no substantial amount of clay will be rendered hydrophilic during transit but with the passage of time, while well conditions are static the continued dissolving or dispersion of the accelerator will overcome the effects of the inhibitor allowing the clay to become hydrophilic and swell and gel in situ.

7. The method of recovering lost circulation in a well which comprises introducing into the well and transmitting to the location where circulation is being lost Rosamond Lake clay, an inhibitor therefor for temporarily rendering the clay hydrophobic, selected from the group consisting of sodium tripolyphosphate and sodium acid pyrophosphate and an accelerator in sufficient quantity to overcome the effects of the inhibitor and render the clay hydrophilic, selected from the group consisting of strong hydroxides and silicate of soda, the acceleration being in a form wherein its exposed surface is small per unit of its volume, and allowing the conditions of the well to become static whereby no substantial amount of the clay will be rendered hydrophilic during transit but with the passage of time while well conditions are static, the continued dissolving or dispersion of accelerator will overcome the effects of the inhibitor allowing the clay to become hydrophilic and swell and gel in situ.

8. The method of recovering lost circulation in a well which comprises introducing into the well and transmitting to the location where circulation is being lost sepiolite type clay, an inhibitor therefor for temporarily rendering the clay hydrophobic, selected from the group consisting of sodium tripolyphosphate and sodium acid pyrophosphate and an accelerator in sufficient quantity to overcome the effects of the inhibitor and render the clay hydrophilic, selected from the group consisting of strong hydroxides and metallic chlorides, the accelerator being in a form wherein its exposed surface is small per unit of its volume, and allowing conditions in the well to become static whereby no substantial amount of the clay will be rendered hydrophilic during transit, but with the passage of time while well conditions are static, the continued dissolving or dispersion of the accelerator will overcome the effects of the inhibitor allowing the clay to become hydrophilic and swell and gel in situ.

9. A composition for use in recovering lost circulation in wells comprising the following ingredients in approximately the following proportions by weight: 60% expandable type bentonite clay; 5% of an inhibitor to temporarily render the clay hydrophobic selected from the group consisting of sodium tripolyphosphate, sodium acid pyrophosphate and metallic chloride, the remainder being an inert material and an accelerator, the accelerator being present in sufficient quantity to overcome the effects of the inhibitor and render the clay hydrophilic selected from the group consisting of strong hydroxides and silicate of soda, the accelerator being in a form wherein its exposed surface is small per unit of volume.

10. A composition for use in recovering lost circulation in wells comprising Rosamond Lake clay, sufficient inhibitor to render the same hydrophobic, selected from the group consisting of sodium tripolyphosphate, and sodium acid pyrophosphate and an accelerator in sufficient quantity to overcome the effects of the inhibitor and render the clay hydrophilic, selected from the group consisting of strong hydroxides and silicate of soda, the accelerator being in a form wherein its exposed area is small per unit of volume.

11. A composition for use in recovering lost circulation in wells comprising sepiolite clay, sufficient inhibitor to render the same hydrophobic selected from the group consisting of sodium tripolyphosphate and sodium acid pyrophosphate and an accelerator in sufficient quantity to overcome the effects of the inhibitor and render the clay hydrophilic, selected from the group consisting of metallic chlorides and strong hydroxides, the accelerator being in a form wherein its exposed surface is small per unit of volume.

References Cited in the file of this patent

UNITED STATES PATENTS

| | | |
|---|---|---|
| Re. 22,196 | Heard | Oct. 6, 1942 |
| 2,221,175 | Bechtold | Nov. 12, 1940 |
| 2,519,045 | Houghton | Aug. 15, 1950 |
| 2,657,149 | Iler | Oct. 27, 1953 |
| 2,705,050 | Davis et al. | Mar. 29, 1955 |
| 2,801,077 | Howard et al. | July 30, 1957 |
| 2,806,530 | Binkley | Sept. 17, 1957 |
| 2,861,636 | Messenger | Nov. 25, 1958 |
| 2,875,835 | Watkins et al. | Mar. 3, 1959 |
| 2,879,847 | Irwin | Mar. 31, 1959 |

UNITED STATES PATENT OFFICE
CERTIFICATE OF CORRECTION

Patent No. 3,028,913            April 10, 1962

Arthur L. Armentrout

It is hereby certified that error appears in the above numbered patent requiring correction and that the said Letters Patent should read as corrected below.

Column 12, line 48, for "mentonite" read -- bentonite --.

Signed and sealed this 25th day of June 1963.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,028,913            April 10, 1962

Arthur L. Armentrout

It is hereby certified that error appears in the above numbered patent requiring correction and that the said Letters Patent should read as corrected below.

Column 12, line 48, for "mentonite" read -- bentonite --.

Signed and sealed this 25th day of June 1963.

(SEAL)
Attest:

ERNEST W. SWIDER
Attesting Officer

DAVID L. LADD
Commissioner of Patents